United States Patent
Yasuda

(10) Patent No.: US 11,690,365 B2
(45) Date of Patent: Jul. 4, 2023

(54) FISHING REEL, AND ITS BRAKING DEVICE AND BRAKING SYSTEM

(71) Applicant: GLOBERIDE, Inc., Tokyo (JP)

(72) Inventor: Hiromu Yasuda, Toyko (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 17/411,619

(22) Filed: Aug. 25, 2021

(65) Prior Publication Data

US 2022/0061287 A1   Mar. 3, 2022

(30) Foreign Application Priority Data

Aug. 27, 2020   (JP) ................................ 2020-143234

(51) Int. Cl.
　　*A01K 89/01* (2006.01)
　　*A01K 89/027* (2006.01)
　　*A01K 89/033* (2006.01)

(52) U.S. Cl.
　　CPC .......... *A01K 89/027* (2013.01); *A01K 89/033* (2013.01)

(58) Field of Classification Search
　　CPC .... A01K 89/033; A01K 89/027; A01K 85/01; G06K 7/10366
　　See application file for complete search history.

(56) References Cited

U.S. PATENT DOCUMENTS

| 2004/0148843 | A1 | 8/2004 | Ikuta et al. |
| 2007/0108330 | A1 | 5/2007 | Ikuta et al. |
| 2015/0264904 | A1* | 9/2015 | Castaneda ............. A01K 97/00 43/17.1 |
| 2016/0278360 | A1 | 9/2016 | Battah et al. |
| 2017/0290312 | A1* | 10/2017 | Castaneda ............ G01G 19/415 |
| 2020/0165109 | A1* | 5/2020 | Niitsuma ......... A01K 89/01555 |
| 2021/0350350 | A1* | 11/2021 | Calagaz ............... G06Q 20/202 |

FOREIGN PATENT DOCUMENTS

| JP | 2000209989 A | 8/2000 |
| JP | 2004208630 A | 7/2004 |
| JP | 2007135417 A | 6/2007 |
| JP | 2011206013 A | * 10/2011 |

OTHER PUBLICATIONS

Chinese Office Action for related Chinese Application No. 202110966256.8; action dated Sep. 15, 2022; (19 pages).
Office Action for related Chinese Application No. 202110966256.8; action dated Mar. 24, 2023; (21 pages).
Office Action for related Japanese Application No. 2020-143234; action dated May 23, 2023; (8 pages).

* cited by examiner

*Primary Examiner* — Emmanuel M Marcelo
(74) *Attorney, Agent, or Firm* — K&L Gates LLP

(57) ABSTRACT

A spool braking device of a fishing reel according to an embodiment of the present disclosure includes a spool rotatably mounted on a reel body on which a fishing line at one end of which a lure is attached is wound so as to be unwound, a spool brake that is provided on the spool and the reel body and that brakes the spool, and a spool braking force controller connected to the spool brake and capable of controlling a braking force by the spool brake, wherein the spool braking force controller is configured to change the braking force by the spool brake based on a set value of the braking force corresponding to the lure information.

10 Claims, 6 Drawing Sheets

FISHING REEL, AND ITS BRAKING DEVICE AND BRAKING SYSTEM

CROSS-REFERENCE TO RELATED APPLICATIONS

This application claims priority under 35 U.S.C. § 119 to Japanese Patent Application No. 2020-143234 filed on Aug. 27, 2020, in the Japanese Intellectual Property Office, the entire contents of each hereby incorporated by reference.

FIELD

The present disclosure relates to a fishing reel, and a braking device and a braking system that can be used in a fishing reel.

BACKGROUND

Conventionally, when casting an object such as a lure, a fishing line, a weight and a hook to a distance using a double bearing reel, a braking device that brakes a spool is often provided to prevent a backlash (line entanglement) upon casting. Such a braking device makes it possible to cast the farthest when a braking force is optimized. However, if the braking force is too large, the flying distance reduces. On the other hand, if the braking force is too small, it causes backlash. The optimization of the braking force may vary depending on the types of fishing tools used, such as the weight and air resistance of a lure to be cast, the type of a fishing line, and the characteristics of a rod. It may also vary depending on a user's casting method, and weather conditions such as wind. The user needs to adjust the braking force during use by trial and error.

Japanese Patent Application Publication No. 2007-135417 ("Patent Literature 1") discloses a spool braking device of a double bearing reel that is used for casting, is rotatably mounted to a reel body, and brakes a spool to which a fishing line is fitted, and that includes a spool braking means that is provided on a spool and a reel body and that electrically and controllably brakes the spool, a first operation tool that is movably provided on the reel body and is operable to a plurality of first operation positions, a second operation tool that is movably provided on the reel body and that is operable to a plurality of second operation positions, and a spool control means that electrically controls a braking force of a spool braking means according to the first operation position of the first operation tool and the second operation position of the second operation tool.

SUMMARY

However, in the configuration according to Patent Literature 1, it is necessary to operate one of the two operating tools in order to change a braking force, which is not only complicated, but also problematic in that when casting a lure whose characteristics are unknown to a user, it is necessary to repeat the casting a plurality of times in order to optimize the set value of the braking device.

The present disclosure has been made in view of the above circumstances, the objective of which is to provide a fishing reel, a braking device and a braking system that can easily and accurately optimize a set value of the braking device. Other objectives of the present disclosure will become apparent upon reference to this specification in its entirety.

A spool braking device of a fishing reel according to an embodiment of the present disclosure includes a spool that is rotatably mounted on the reel body and on which a fishing line at one end of which a lure is attached is wound so as to be reeled out, and includes a spool brake (spool braking unit or spool braking portion) that is provided on the spool and the reel body and that brakes the spool, and a spool braking force controller (braking force controlling unit or braking force controlling portion) connected to the spool brake and capable of controlling a braking force by the spool brake, wherein the spool braking force controller is configured to change the braking force by the spool brake based on a set value of the braking force corresponding to the lure information.

A spool braking device of a fishing reel according to an embodiment of the present disclosure includes a tag identification portion (tag identification unit) attachable to the lure and capable of reading an identification tag to identify the lure, wherein the lure information is configured to be determined from the read identification tag information.

In a spool braking device of a fishing reel according to an embodiment of the present disclosure, the identification tag is configured to be any one of a bar code, a QR-code® or a RFID tag.

In a spool braking device of a fishing reel according to an embodiment of the present disclosure, the tag identification portion is configured to be capable of reading at least one of a bar code, a QR Code® or a RFID Tag.

In a spool braking device of a fishing reel according to an embodiment of the present disclosure, the tag identification portion is configured to image-recognize the identification tag with a camera.

A spool braking device of a fishing reel according to an embodiment of the present disclosure includes a receiver (receiving unit or receiving portion) that receives an input from an external information communication device, wherein the lure information is the information received from the information communication device.

In a spool braking device of a fishing reel according to an embodiment of the present disclosure, the lure information includes the weight information and the air resistance information of the lure, wherein the spool braking force controller is configured to change a braking force by the spool brake based on a set value of the braking force according to the weight information and the air resistance information of the lure.

A fishing reel according to an embodiment of the present disclosure is configured to include any one of the braking devices described above.

A braking system according to an embodiment of the present disclosure is configured to include a lure information identification device that identifies the lure information, and the braking device described above.

In a braking system according to an embodiment of the present disclosure, the lure information identification device is configured to be provided in a housing case of the lure or to be attached to a garment.

According to the above embodiment, it is possible to provide a fishing reel, a braking device and a braking system that can easily and accurately optimize a set value of a braking device.

DETAILED DESCRIPTION

Figures 1A, 1B, 1C, 1D:
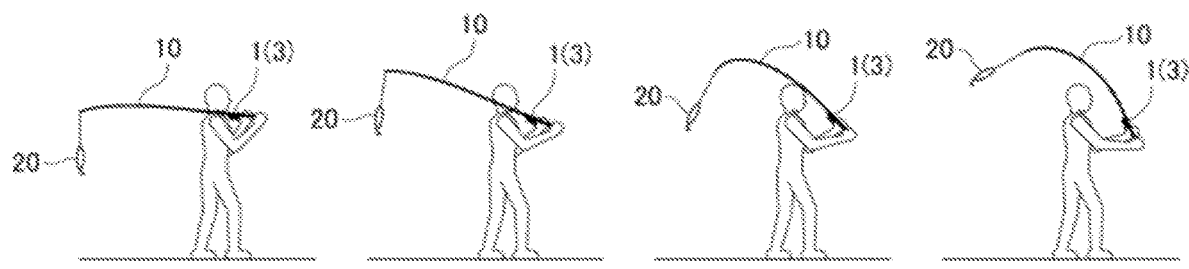
FIG. 1A is a diagram illustrating an outline of a casting procedure upon casting according to an embodiment of the present disclosure.
FIG. 1B is a diagram illustrating an outline of a casting procedure upon casting according to an embodiment of the present disclosure.
FIG. 1C is a diagram illustrating an outline of a casting procedure upon casting according to an embodiment of the present disclosure.
FIG. 1D is a diagram illustrating an outline of a casting procedure upon casting according to an embodiment of the present disclosure.

Hereinafter, embodiments of the present disclosure will be described in detail with reference to the accompanying drawings. Components common in the plurality of drawings are denoted by the same reference numerals through the plurality of drawings. It should be noted that each of the drawings is not necessarily scaled for convenience of explanation.

First, an example of a procedure for casting and retrieving fishing tools such as a lure using a general reel including the reel will be described with reference to FIGS. 1 and 2.

As shown in FIG. 1(a), a lure 20 is adjusted by a reel 1 to a predetermined length from the rod tip of a fishing rod 10, a clutch 2 (not illustrated) of the reel 1 is turned off and made into a spool-free state. At this time, a spool 3 of the reel 1 is pressed by a thumb so that a fishing line is not unwound due to the self-weight of the lure 20 or the like.

Next, as shown in FIGS. 1(b) to (d), the initial speed is given to the lure 20 by swinging the fishing rod 10. Then, as shown in FIG. 1(e), the lure 20 can be cast when releasing the thumb from the spool 3 at the timing when the lure speed and the unwinding direction become appropriate.

Figures 1E, 1F, 1G:
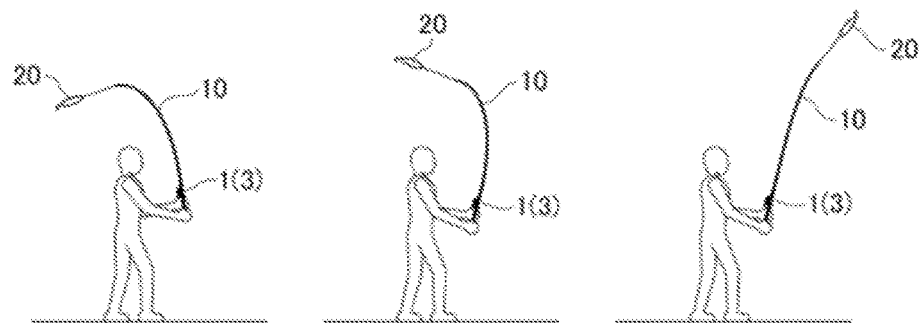
FIG. 1E is a diagram illustrating an outline of a casting procedure upon casting according to an embodiment of the present disclosure.
FIG. 1F is a diagram illustrating an outline of a casting procedure upon casting according to an embodiment of the present disclosure.
FIG. 1G is a diagram illustrating an outline of a casting procedure upon casting according to an embodiment of the present disclosure.
Figure 2:
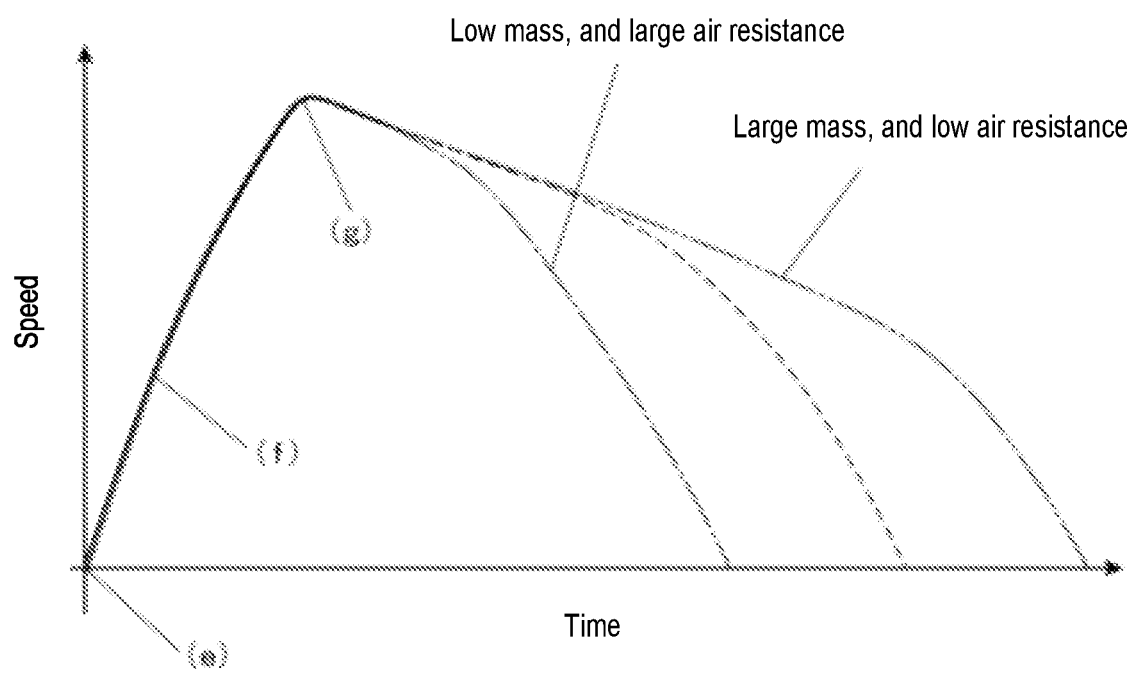
FIG. 2 is a diagram illustrating the influence of a rotation speed of a spool according to an embodiment of the present disclosure.

Next, FIG. 2 is a diagram illustrating the speed change of the spool 3 from the commencement of casting. As illustrated, the horizontal axis represents the time elapsed from the commencement of casting (e), and the vertical axis represents the speed of the spool 3. After casting, the lure 20 accelerates while changing its trajectory as shown in FIGS. 1(f) to (g).

Further, after casting, following the moment in FIG. 1(g), the lure 20 starts decelerating, receiving tension from the fishing line and air resistance. On the other hand, the spool 3 starts rotating backward due to tension from the fishing line. When the unwinding speed of the fishing line coincides with the flying speed of the lure 20, the rotation speed of the spool 3 reaches the maximum, and the fishing line loses tension. Thereafter, the lure 20 continues to decelerate due to air resistance and the like. At this time, if the spool 3 continues to rotate at high speed due to inertia, the unwinding speed of the fishing line exceeds the flying speed of the lure 20. As a result, the fishing line is excessively unwound, and the line becomes entangled in the reel 1. To avoid this, the spool 3 can be provided with a predetermined braking force by a braking device 5.

Thereafter, when the lure 20 is sufficiently lowered, it will land on water. At this time, if a braking force from the braking device 5 is too large, the casting distance of the lure 20 is shortened. On the other hand, if a braking force from the braking device 5 is too small, the fishing line is entangled, and cannot be wound nor unwound normally. The optimal value of the braking force may vary according to the mass of the lure 20 and air resistance as illustrated in FIG. 2, as well as the length of the rod, casting method, natural environment such as wind, and other various factors.

Next, a mechanical model relating to the flying lure 20, a fishing line and the spool 3 will be described with reference to FIGS. 3(a) to (c).

Figure 3A:
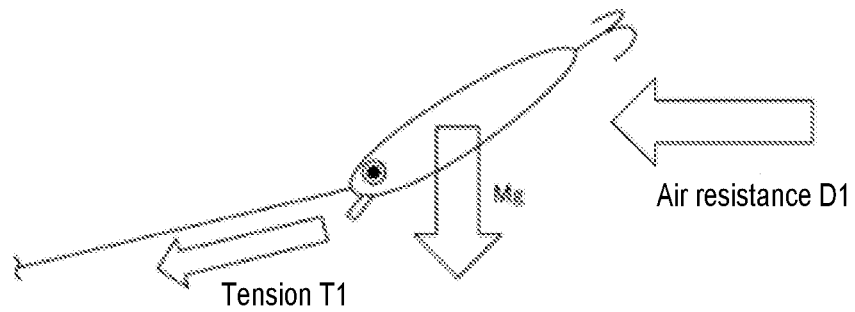
FIG. 3A is a diagram illustrating a braking force of a braking device according to an embodiment of the present disclosure.

As shown in FIG. 3(a), when the mass of the lure 20 is M, the speed is v1, the tension when pulled by the fishing line is T1, the air resistance is D1, and the gravitational acceleration is g, the equation of motion is as follows.

$$M \cdot d(v1)/dt = D1 + T1 + Mg \quad (1)$$

Figure 3B:
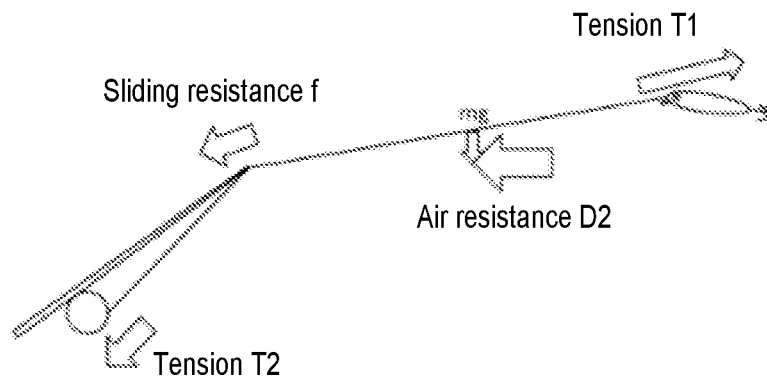
FIG. 3B is a diagram illustrating a braking force of a braking device according to an embodiment of the present disclosure.

Further, with respect to the fishing line, as shown in FIG. 3(b), when the mass of the flying fishing line is m, the speed of the center of gravity is v2, the tension when the fishing line is pulled by the lure is T1, the air resistance the fishing line receives is D2, the sliding resistance the fishing line receives from a guide or the like provided on the fishing rod is f, and the tension when the fishing line is pulled by the spool is T2, the equation of motion is as follows.

$$m \cdot d(v2)/dt = T1 + D2 + mg + f + T2 \quad (2)$$

In particular, when it can be assumed that the fishing line is straight and that the center of gravity is located at the midpoint with the lure, and when the length of the unwound fishing line is Lt and the density is ρ, the equation (2) can be rewritten as below.

$$\rho Lt \cdot d(v1/2)/dt = T1 + D2 + mg + f + T2 \quad (2')$$

Figure 3C:
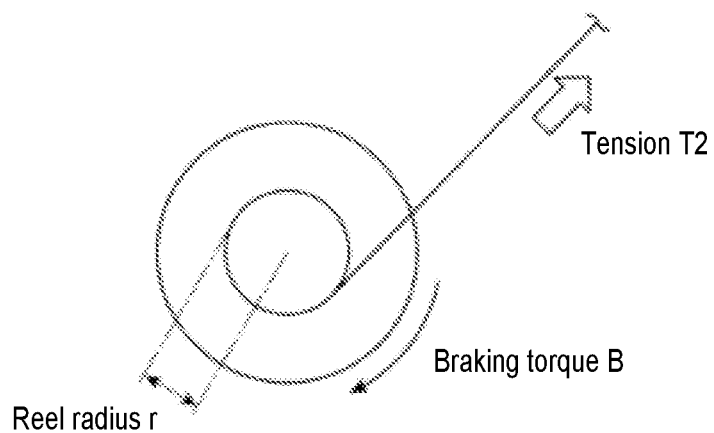
FIG. 3C is a diagram illustrating a braking force of a braking device according to an embodiment of the present disclosure.

Further, with respect to the spool, as shown in FIG. 3(c), when the inertia of the spool is I, each speed is ω, the tension when pulled by the fishing line is T2, the radius around which the fishing line is wound is r, and the braking torque is B, the equation of motion is as follows.

$$I \cdot d\omega/dt = rT2 - B \quad (3)$$

When the unwinding speed of the fishing line unwound from the spool exceeds the flying speed of the lure, slack occurs in the line, and eventually the line becomes entangled. In other words, if the following state, $$r\omega \leq v1 \quad (4)$$

can be maintained at all times, no slack occurs in the line. When the elongation of the fishing line is negligible, the equation is as follows.

$$r\omega = v1 \quad (4')$$

Next, in order to explain the optimization of the brake set value, the equations (1) to (4) can be simplified by making the following assumptions.
 a) Only the horizontal movement of the lure is considered, and it is assumed that tension only acts horizontally.
 b) Coordinate system with a positive value being the flying direction and zero being the casting commencement point
 c) The weight of the fishing line is ignored.
 d) The time change of the windup radius r of the spool is ignored.

$$d/dt\, Mv1 = -D1 - T1 \quad (1')$$

The maximum flying distance is obtained when the acceleration d/dt v1 is maximum. Since both D1 and T1 act only in a deceleration direction, the maximum flying distance is obtained when the influence of the tension T1 is minimal. In other words, a braking set value is desirable such that the lure 20 decelerates only by air resistance without being pulled by the fishing line. The then acceleration a1 is as follows.

$$d/dt\, v1 = a1 - D1/M \quad (5)$$

Assuming that T1=T2=0 from the assumption, above (3) is as follows.

$$d/dt\, \omega = 1/r\, a1 = -B$$

$$B = ID1/Mr \quad (6)$$

That is, changing the braking force B to the spool in proportion to the air resistance D1 synchronizes the speed of the fishing line unwound from the spool with the speed of the lure, and the value of the tension T1 becomes minimal.

For the air resistance D1, assuming that the projected area in the direction of movement is A, that the wind velocity around the lure is V, and that the turbulence is dominant, the following equation is established.

$$D1 = k\, A(V-v1)^2 \quad (7)$$

k is the air resistance coefficient. Substituting this into (6) above, $$B = I(V-v1)^2/r\, kA/M \quad (8)$$

That is, according to the air resistance coefficient k of the lure, and the ratio of the projected area A to the mass M, the optimum braking set value changes. Therefore, when the lure is replaced, the braking set value can be optimized if the values of k, A and M of the lure are obtained.

Figure 4:
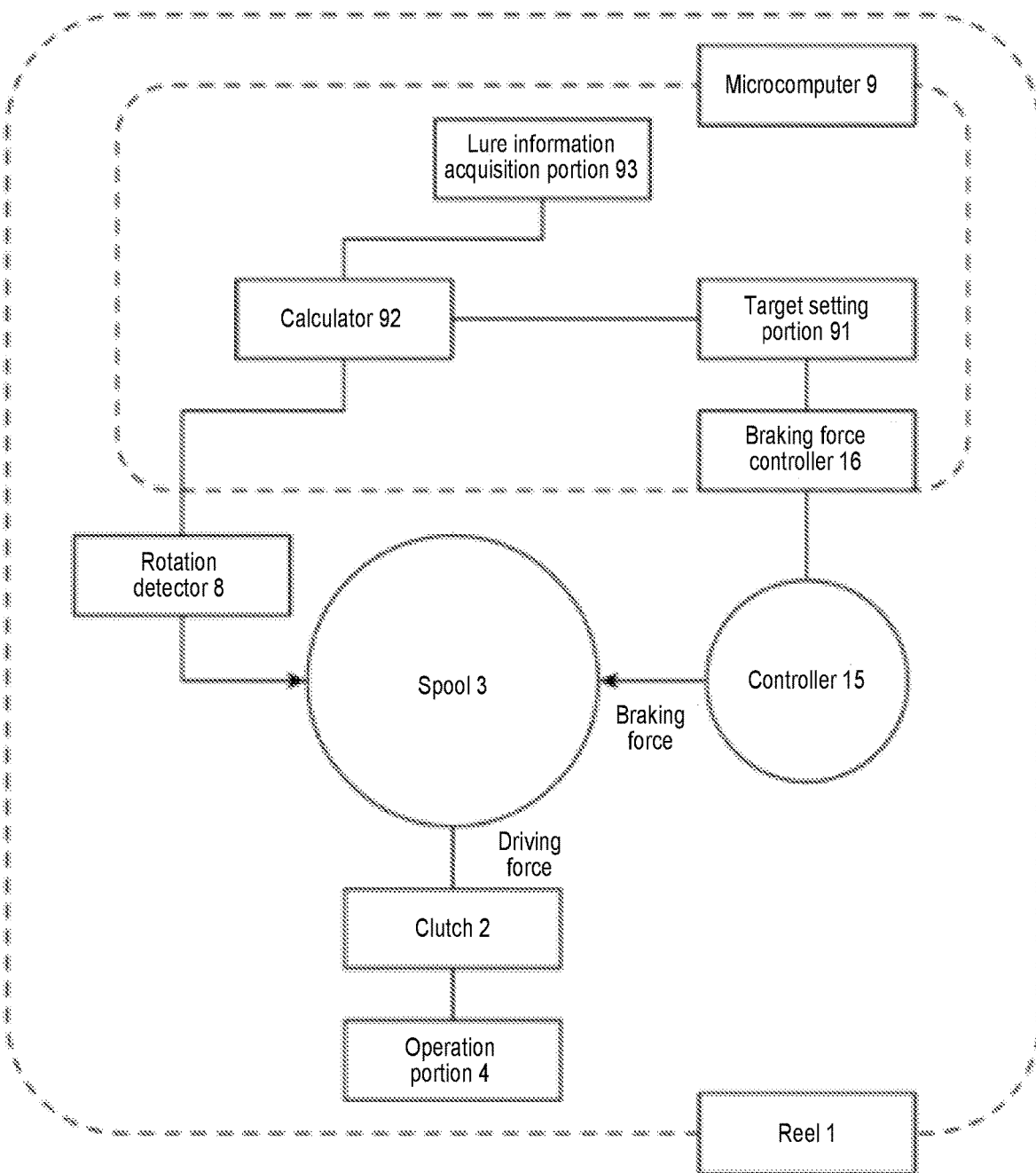
FIG. 4 is a diagram illustrating a fishing reel having a braking device according to an embodiment of the present disclosure.

Next, the configuration of a fishing reel 1 according to an embodiment of the present disclosure will be described with reference to FIG. 4. As illustrated, the fishing reel 1 according to an embodiment of the present disclosure includes the spool 3 that winds a fishing line, an operation portion (operation unit) 4 that rotates the spool 3, the clutch 2 that switches from being transmissible to non-transmissible and vice versa between the operation portion 4 and the spool 3, a brake (braking unit or braking portion) (spool brake) 15 that generates a braking force in the spool 3, and a braking force controller (spool braking force controller) 16 that adjusts a braking force.

As illustrated, the fishing reel 1 according to an embodiment of the present disclosure includes a rotation detector (rotation detecting unit or rotation detecting portion) 8 that detects the rotation of the spool 3. The rotation detector 8 may be configured by a combination of a detection means such as a photo interrupter and a means to be detected such as a light shielding plate provided on the spool 3. This allows the rotation of the spool 3 to be converted into an electrical signal. The combination of the detection means and the means to be detected is not limited to the above example, and a known means such as a magnet and a magnetic sensor can be used.

Further, the fishing reel 1 includes a microcomputer 9 that processes various signals. The microcomputer 9 is fed from a power source such as a battery (not illustrated), and includes, for example, a target setting portion (target setting unit) 91 that instructs a target braking force to a braking force controller, a calculator (calculation unit or calculation portion) 92 that calculates casting results based on the output of a spool rotation sensor, and a lure information acquisition portion (lure information acquisition unit) 93 that acquires the information of the lure 20.

Next, each element constituting the fishing reel 1 will be described. The spool 3 is rotatably supported with respect to the fishing reel 1, and can wind a fishing line by forward rotation, and unwind the wound fishing line by backward rotation. The operation portion 4 is configured, for example, as a handle, and transmits the rotation operation by a user to the spool 3 through a transmission mechanism such as a gear, so that the spool 3 can be rotated forward. Incidentally, the operation unit 4 may also be a combination of an operation member such as a lever, and a power source such as a motor.

The clutch 2 can switch between the ON state in which power can be transmitted to the spool 3 and the OFF state that does not involve power transmission. In the ON state, the spool 3 can be rotated in the forward direction by an operation member 3, and in the OFF state, it can be rotated in the forward and backward directions regardless of the state of the operation member 3 (spool-free state).

Next, the braking device 5 according to an embodiment of the present disclosure will be described in detail. The spool brake 15 of the braking device 5 according to an embodiment of the present disclosure is configured by a rotator-shaped eddy current generating plate made of a conductor attached to the spool 3, a fixed magnet disposed to face the eddy current generating plate, a rotating magnet that, along with the fixed magnet, sandwiches the eddy current generating plate from the opposite side of the fixed magnet, a motor that rotates and moves the rotating magnet, a gear train that decelerates, and transmits to a second permanent magnet, the driving of a motor, and a magnet position sensor that detects the position of the permanent magnet.

The outer peripheral portion of the fixed magnet is divided into six equal parts, which are alternately magnetized the N-pole and the S-pole. Further, the inner peripheral portion of the rotating magnet is divided into six equal parts, which are alternately magnetized the N-pole and the S-pole. The magnetic field created by the fixed magnet and the rotating magnet penetrates the eddy current generating plate located therebetween. Therefore, when the spool 3 rotates, an eddy current is generated in the eddy current generating plate, and a braking force acts according to the rotation speed.

It is possible to change the magnetic field acting on the eddy current generating plate by rotating the rotating magnet by the motor and the gear train. Thus, a braking force can be set to a predetermined amount. That is, when the same poles of the rotating magnet and the fixed magnet are opposed to each other, the magnetic field applied to the eddy current generating plate weakens, and the braking force is diminished. When the different poles of the rotating magnet and the fixed magnet are opposed to each other, the magnetic field applied to an eddy current generating plate 51 strengthens, and the braking force increases.

The magnet position sensor is a sensor that detects the position of the rotating magnet, and is configured by a known position sensor such as a magnetic sensor and an electric resistance-type sensor.

The braking force controller 16 conducts feedback-control of a motor by passing a necessary current to a motor while monitoring the value of the magnet position sensor, so that a predetermined braking force can be applied to the spool 3. Thus, the braking force applied to the spool 3 can be changed over time by the brake 15 and the braking force controller 16.

Incidentally, the eddy current generating plate may be configured by part of the spool 3. Further, the eddy current generating plate may have a predetermined braking force characteristic by relatively moving the same with respect to the spool 3 by the action of the centrifugal force according to the rotation speed of the spool 3.

Further, the above-described brake 15 is not limited to the method using an eddy current as descried above, and the same effect can be obtained as long as a braking force can be adjusted by a microcomputer over time. Other methods of the braking device are not limited to specific methods, and include a method of generating regenerative brake between a permanent magnet attached to the spool and a coil provided on the reel body, and a method of using a contact brake that changes the contact force to a friction plate attached to the spool by an electromagnetic actuator or the like.

Figure 5:
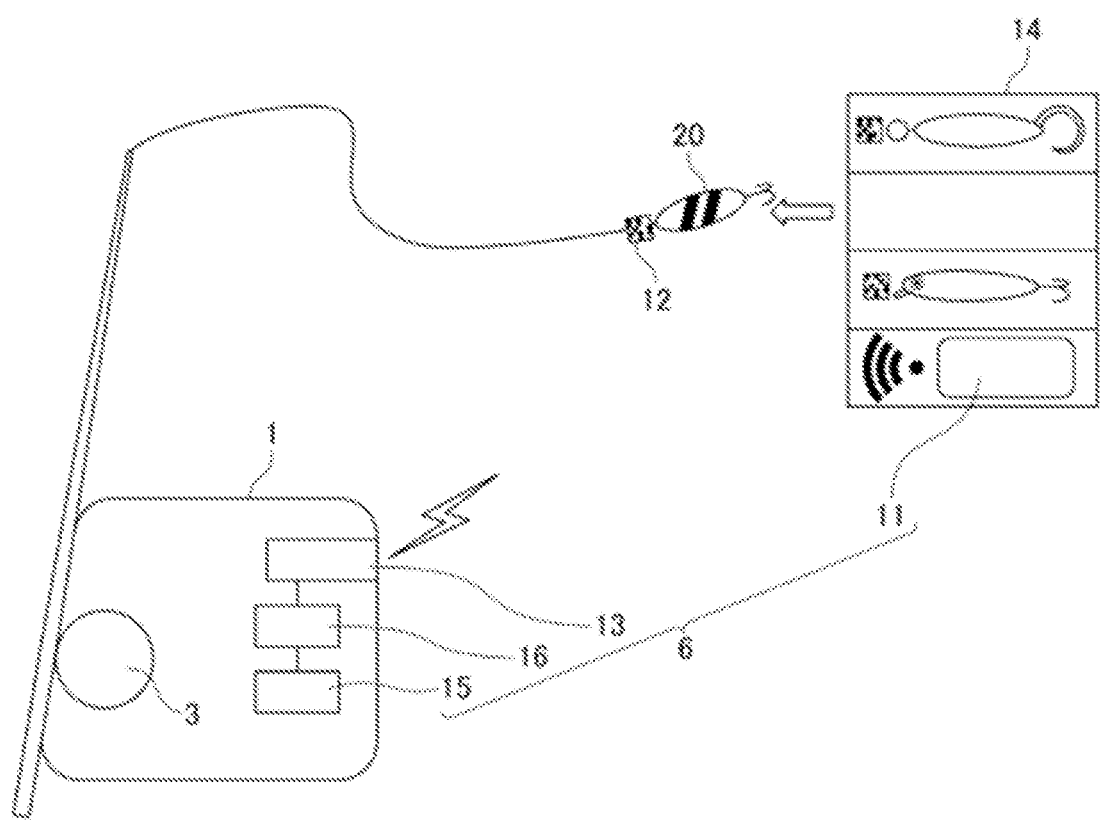
FIG. 5 is a diagram illustrating a braking system according to an embodiment of the present disclosure.

Next, the braking device 5 of the fishing reel 1 according to an embodiment of the present disclosure or a lure information acquisition portion (lure information acquisition unit) 93 of a braking system 6 will be described in detail with reference to FIG. 5. An ID identification tag (identification tag) 12 is attached to the lure 20 to identify each lure. The lure information acquisition portion 93 includes an identification device (identification portion (identification unit)) 11 that distinguishes (identifies) the ID identification tag 12 to be attached to the lure 20, and a receiver 13 that receives information from the identification device (identification portion) 11. In the illustrated example, the identification device (identification portion) 11 is provided on a lure box 14 described later; however, it can also be attached to other fishing tools, garments and the like. Further, the identification device (identification portion) 11 may also be provided in the braking device 5 of the fishing reel 1 according to an embodiment of the present disclosure. The details will be described later.

The ID identification tag 12 is provided with ID information to identify each lure 20, and the ID information can be obtained by the identification device (identification portion) 11. In the braking device 5 or the braking system 6 of the fishing reel 1 according to an embodiment of the present disclosure, a passive RF tag and a RFID reader can be used as the ID identification tag 11 and as the identification device (identification portion) 11, respectively. As a result, power supply to the ID identification tag 12 is unnecessary and therefore, non-contact ID identification becomes available. The identification device (identification portion) 11 is configured by an antenna, a power supply and a control circuit, and is appropriately waterproofed and incorporated into the lure box 14.

When a user replaces a lure, the ID identification tag 12 of the lure is brought close to the antenna. The identification device (identification portion) 11 acquires the ID information of the lure, and transmits the information to the receiver 13 in the reel 1. Within a braking force controlling device 6, the optimum braking set value is calculated from the acquired ID information of the lure, and the braking force of the braking device is set according to the value. As a calculation method of the optimum value, the values of the lure ID, the lure weight M, the air resistance coefficient k and the cross-sectional area A may be input in a reference table in advance, or the above-mentioned coefficient may be entered in the ID identification tag 12 together with the lure ID.

Thus, when replacing the lure, it is possible to immediately set the optimum braking set value for that lure. Further, incorporating the identification device 11 into the lure box 14 makes it possible to efficiently perform the operation of having the replacement lure recognized. Further, the lure recognition function can be realized without increasing the number of devices to be carried by a user.

The identification device 11 has various embodiments, such as incorporation into the reel 1 or a mobile phone, incorporation into a watch, a life jacket or other garment that is wearable while fishing, incorporation into a cooler, and use as a stand-alone device, in addition to incorporation in a lure box.

Here, a case where the identification portion 11 is incorporated into the reel 1 will also be described. A spool braking device 15 of the fishing reel 1 according to an embodiment of the present disclosure includes the spool 3 on which a fishing line at one end of which the lure 20 is attached is wound so as to be unwound, and includes the spool brake 15 that is provided on the spool 3 and the reel body, and brakes the spool 3, and the spool braking force controller 16 connected to the spool brake 15 and capable of controlling a braking force by the spool brake 15, wherein the spool braking force controller 16 is configured to change a braking force by the spool brake 15 based on a set value of the braking force appropriate to the information of the lure 20.

The spool braking device 15 of the fishing reel 1 according to an embodiment of the present disclosure makes it possible to easily and accurately perform the set value optimization of the braking device.

The spool braking device 15 of the fishing reel 1 according to an embodiment of the present disclosure includes the identification portion (tag identification portion) 11 that is attachable to the lure 20 and that can read the identification tag 12 to identify the lure 20, wherein the information of the lure 20 is configured to be determined from the information of the read identification tag 12.

The spool braking device 15 of the fishing reel 1 according to an embodiment of the present disclosure can change the casting condition in accordance with the identification results of the cast object such as a lure, which makes it possible to easily optimize the changes in the settings.

In the spool braking device 15 of the fishing reel 1 according to an embodiment of the present disclosure, the identification tag 12 is configured to be any one of a bar code, a QR-code® or a RFID tag.

In the spool braking device 15 of the fishing reel 1 according to an embodiment of the present disclosure, the tag identification portion 11 is configured to be capable of reading at least one of a bar code, a QR Code® or a RFID Tag.

In the spool braking device 15 of the fishing reel 1 according to an embodiment of the present disclosure, the tag identification portion 11 is configured to image-recognize the identification tag with a camera.

In the spool braking device 15 of the fishing reel 1 according to an embodiment of the present disclosure, the information of the lure 20 includes the weight information and the air resistance information of the lure 20, wherein the spool braking force controller 16 is configured to change a braking force by the spool brake based on a set value of the braking force according to the weight information and the air resistance information of the lure.

The fishing reel 1 according to an embodiment of the present disclosure is configured to include the above-described braking device 15. Note that, as described above, when the identification portion 11 is outside the fishing reel 1, the braking system 16 according to an embodiment of the present disclosure is configured to include a lure information identification device (identification device) 11 that identifies the lure information, and the braking device 15 described above.

The braking system 16 according to an embodiment of the present disclosure can change the casting condition in accordance with the identification results of a cast object such as a lure, which makes it possible to easily optimize the changes in the settings.

Next, the brake setting method, that is, the setting of a braking force performed by the braking force controller 16 will be described. With respect to the air resistance coefficient k and the cross-sectional area A, the posture of the actual lure upon casting is not uniquely determined, and varies depending on a user's casting technique and the like. Further, the air resistance coefficient k changes depending on the shape. However, an average value of kA is obtained by repeating casting a plurality of times, and becomes a lure-specific value. This value is defined as the air resistance level C.

The value of C is generally determined when the type, shape and weight of the lure are specified. The values of similar lures can be inferred if the values of a plurality of typical lures are measured in advance. A list of the lure ID, the air resistance level C and the mass M can be input in advance. Alternatively, the air resistance level C and the mass M may also be referred to from the lure ID through the Internet.

Let us now consider the case where the optimal brake setting B1 for a lure A with a mass M1 and an air resistance level C1 is determined after multiple castings. Subsequently, if the lure is replaced with a lure B with the mass M2 and the air resistance level C2, and if the above assumptions in a) through d) are satisfied, a new braking set value B2 is obtained as follows from equation (8).

$$B2=B1 \times M1/M2 \times C2/C1$$

As described above, when the lure is replaced, the braking set value can be easily optimized when the lure is replaced by transmitting the lure-specific M/C values upon such replacement being made. Transmitting the values of M and C separately is useful to calculate a more accurate correction formula even if the assumptions in a) through d) are not satisfied.

Next, with reference to FIG. 5, a case where a lure is recognized by reading a QR Code® Will be Described. In the Example Described Above, a RFID is Used as an Example of the embodiment of the lure information acquisition portion 93, but the embodiments are not limited to the illustrated example. A two-dimensional code such as a bar code and a QR Code® can be Used as the ID identification tag 12, and a bar code reader and an image recognition means such as a camera can be used as the identification device (identification portion) 11. When it is difficult to attach the ID identification tag 12 to the lure itself for reasons such as waterproofing and downsizing, a list with a photograph of the lure and a bar code are printed on it may be prepared separately. This makes it possible to select a combination of the target lure and the identification tag from the list, and to obtain the ID with the identification device 11, instead of recognizing the lure body. This method also achieves the same effect as in the example of the embodiment described above.

Figure 6:
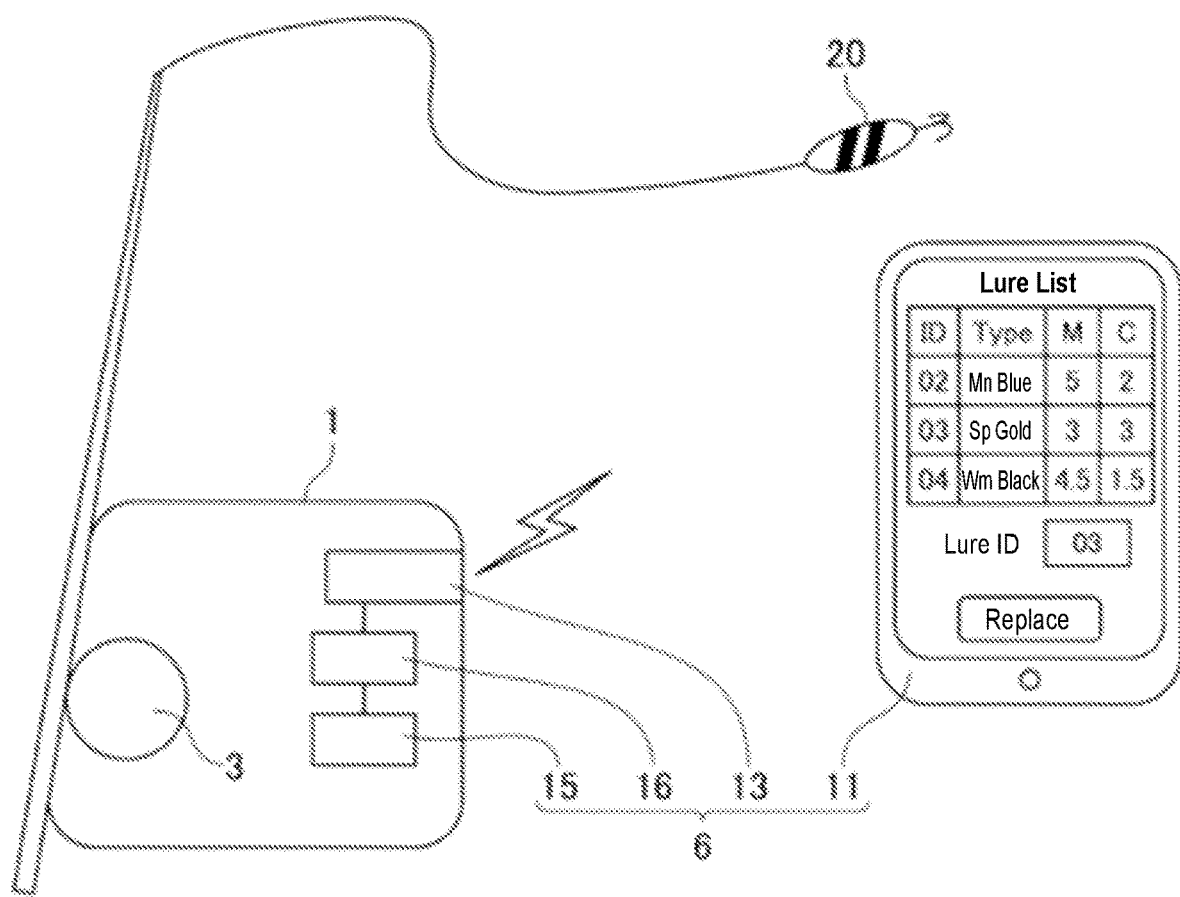
FIG. 6 is a diagram illustrating a braking system according to an embodiment of the present disclosure.

Next, another embodiment of the lure recognition method will be described. Instead of the lure information acquisition portion 93 described above, a user may identify the selected lure 20. FIG. 6 shows a case where the identification results of the lure 20 are input using an external information communication terminal (external device) such as a smartphone. A list in which the ID and the characteristic value of the lure to be used are input in advance is prepared in a smartphone. When the lure is replaced, the ID of the lure is selected and the information is transmitted to the braking force controlling device 6. This enable to obtain the same effect as in the above-described embodiment.

At this time, information such as the shape and color of the lure, a photographed images and the like may be input so that a user can easily identify the lure. Alternatively, an image may be recognized to extract a choice by comparing an image registered in the list with a image of a selected lure photographed by a camera or the like. Though there may be situations in which it is difficult to accurately identify an ID by recognizing an image, such as where there are a plurality of lures of the same type and different weights on the list, narrowing down the choices alone would improve the usability when many lures are registered.

As a method of inputting the ID of the lure 20, a voice input or the like may be used instead of operating an external device such as a mobile phone with a finger. This makes it possible to perform an input operation to replace a lure, saving the need for taking out an external device such as a mobile phone while fishing.

The dimension, material and arrangement of each component described herein are not limited to those explicitly described in the embodiments, and each component can be modified to have any dimension, material and arrangement that can be included within the scope of the present disclosure. Further, components that are not explicitly described herein may be added to the described embodiments, or some of the components described in each embodiment may also be omitted.

DESCRIPTION OF THE NUMERICAL REFERENCES

1 Fishing reel
2 Clutch
3 Spool
4 Operation portion
5 Spool brake
6 Spool braking force controller
8 Rotation detector
9 Microcomputer
10 Fishing rod
11 Identification device (identification portion)
12 Identification tag
13 Receiver
14 Lure box
15 Braking device
16 Braking system
20 Lure 91 Target setting portion
92 Calculator
93 Lure information acquisition portion

What is claimed is:

1. A spool braking device of a fishing reel with a spool that is rotatably mounted on a reel body and on which a fishing line at one end of which a lure is attached is wound so as to be reeled out, comprising:
    a spool brake that is provided on the spool and the reel body and that brakes the spool; and
    a spool braking force controller connected to the spool brake and capable of controlling a braking force by the spool brake,
    wherein the spool braking force controller changes a braking force by the spool brake based on a set value of a braking force corresponding to lure information.

2. The braking device according to claim 1, comprising a tag identification portion attachable to the lure and capable of reading an identification tag that identifies the lure, wherein the lure information is determined from the read identification tag information.

3. The braking device according to claim 2, wherein the identification tag is any one of a bar code, QR Code® or a RFID Tag.

4. The braking device according to claim 3, wherein the tag identification portion can read at least one of the bar code, the QR Code® and the RFID tag.

5. The braking device according to claim 2, wherein the tag identification portion image-recognizes the identification tag with a camera.

6. The braking device according to claim 1, comprising a receiver that receives an input from an external information communication device, wherein the lure information is information received from the information communication device.

7. The braking device according to claim 1, wherein the lure information includes weight information and air resistance information of the lure, wherein the spool braking force controller changes a braking force by the spool brake based on a set value of a braking force according to the weight information and the air resistance information of the lure.

8. A fishing reel comprising the braking device according to claim 1.

9. A braking system of a fishing reel comprising: a lure information identification device that identifies lure information; and the braking device according to claim 1.

10. The braking system according to claim 9, wherein the lure information identification device is provided in a housing case of the lure or attached to a garment.

* * * * *